(12) United States Patent
Taguchi

(10) Patent No.: US 8,997,812 B2
(45) Date of Patent: Apr. 7, 2015

(54) PNEUMATIC TIRE WITH SPECIFIED INNER LINER

(75) Inventor: Takafumi Taguchi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 965 days.

(21) Appl. No.: 12/676,293

(22) PCT Filed: Aug. 20, 2008

(86) PCT No.: PCT/JP2008/064823
§ 371 (c)(1),
(2), (4) Date: Mar. 3, 2010

(87) PCT Pub. No.: WO2009/057369
PCT Pub. Date: May 7, 2009

(65) Prior Publication Data
US 2010/0170606 A1 Jul. 8, 2010

(30) Foreign Application Priority Data

Nov. 2, 2007 (JP) .................................. 2007-286583
Aug. 5, 2008 (JP) .................................. 2008-201993

(51) Int. Cl.
| | |
|---|---|
| B60C 1/00 | (2006.01) |
| B60C 5/14 | (2006.01) |
| C08L 23/28 | (2006.01) |
| B29D 30/06 | (2006.01) |
| C08L 7/00 | (2006.01) |
| C08L 23/22 | (2006.01) |

(52) U.S. Cl.
CPC ........... B60C 5/14 (2013.01); B29D 2030/0682 (2013.01); B29D 30/0681 (2013.01); B60C 1/0008 (2013.01); C08L 7/00 (2013.01); C08L 23/22 (2013.01); C08L 23/283 (2013.01); C08L 2312/00 (2013.01); Y10S 152/16 (2013.01)

(58) Field of Classification Search
CPC B60C 1/0008; B60C 5/14; B29D 2030/0682; B29D 30/0681; C08L 23/283; C08L 2666/22
USPC .............................. 152/510, DIG. 16; 156/123
See application file for complete search history.

(56) References Cited

U.S. PATENT DOCUMENTS 5,385,980 A * 1/1995 Schaefer et al.
5,922,153 A * 7/1999 Beers et al. .................... 152/510

(Continued)

FOREIGN PATENT DOCUMENTS

| EP | 0 644 918 B1 | 11/1999 |
|---|---|---|
| JP | 2002-212363 A | 7/2002 |

(Continued)

OTHER PUBLICATIONS

German Office Action, dated Mar. 27, 2013, for German Application No. 11 2008 002 946.6.

*Primary Examiner* — Adrienne C Johnstone
(74) *Attorney, Agent, or Firm* — Birch, Stewart, Kolasch & Birch, LLP

(57) ABSTRACT

The present invention relates to a pneumatic tire having an inner liner formed from a rubber composition that includes a butyl rubber in which the Mooney viscosity measured at 130° C. of an unvulcanized rubber of the rubber composition is at least 45, wherein the average value and standard deviation of the butyl rubber gauge of shoulder portion of a finished tire satisfy: (Standard deviation of butyl rubber gauge)/(Average value of butyl rubber gauge)≤0.060. The rubber gauge of the tire exhibits improved uniformity and is superior in air permeability resistance.

2 Claims, 3 Drawing Sheets

(56) References Cited

U.S. PATENT DOCUMENTS

2006/0205858 A1  9/2006  Hirayama et al.
2009/0000718 A1* 1/2009  Rouckhout et al. ....... 152/510 X

FOREIGN PATENT DOCUMENTS

| | | |
|---|---|---|
| JP | 2004-514744 A | 5/2004 |
| JP | 2005-75976 A | 3/2005 |
| JP | 2005-264114 A | 9/2005 |
| JP | 2006-89526 A | 4/2006 |
| JP | 2006-249147 A | 9/2006 |
| JP | 2007-204645 A | 8/2007 |
| JP | 2007-320992 A | 12/2007 |
| JP | 2008-13584 A | 1/2008 |
| JP | 2008-126634 A | 6/2008 |
| JP | 2008-150563 A | 7/2008 |
| WO | WO-02/31039 A1 | 4/2002 |

* cited by examiner

PNEUMATIC TIRE WITH SPECIFIED INNER LINER

TECHNICAL FIELD

The present invention relates to a pneumatic tire.

BACKGROUND ART

In general, the improvement of air permeability resistance is designed for a rubber composition used for an inner liner.

Butyl rubbers such as a butyl rubber and a chlorinated butyl rubber that does not allow air to pass through easily have been conventionally used for producing a rubber composition (rubber composition for an inner liner) used for the inner liner of a tire.

However, although it is considered that a butyl rubber gauge is thickened in order to improve the air permeability resistance, a halogenated butyl rubber used is precious; therefore when a lot of the butyl rubber is used, the production cost of a tire is increased and the light weighting of the tire is not designed. Further, when the fluctuation of the finishing rubber gauge is wide even if the butyl rubber gauge is thickened, there is also generated possibility that air deflates from the thinnest portion of the rubber gauge.

In Japanese Unexamined Patent Publication No. 2005-264114, there is disclosed a rubber composition capable of being used for an inner liner that is obtained by using a specific amount of a halogenated butyl rubber as a rubber component and dividedly kneading zinc oxide with it, in order to make a tire be light weight by thinly keeping the rubber gauge of an inner liner without lowering viscosity in the production step of a tire. However, it is susceptible to improvement with respect to a point that the Mooney viscosity of the rubber composition is controlled and a predetermined gauge is retained at a site at which a gauge is most necessary.

In Japanese Unexamined Patent Publication No. 2006-89526, there is disclosed a rubber composition capable of being used for an inner liner that is obtained by compounding specific amounts of silica, calcium carbonate and carbon black with a rubber component comprising a natural rubber and/or its modified article, in order to provide a tire keeping air permeability resistance and crack growth resistance performance by improving processability at the production of a rubber composition for a tire and using the obtained rubber composition for a tire, for an inner liner. However, it is susceptible to improvement with respect to a point that since the Mooney viscosity is too high, it cannot be used for a usual tire.

In Japanese Unexamined Patent Publication No. 2006-249147, there is disclosed a rubber composition capable of being used for an inner liner that includes a rubber component comprising a natural rubber, silica with low BET specific surface area (nitrogen adsorption specific surface area) and carbon black, in order to improve the rolling resistance of a tire and improve processability. However, it is susceptible to improvement with respect to a point that since the Mooney viscosity is similarly too high, it cannot be used for a usual tire.

DISCLOSURE OF INVENTION

It is the purpose of the present invention to provide a rubber composition improving the uniformity of a butyl rubber gauge and being superior in air permeability resistance (air retaining property), when a tire is molded, by a procedure capable of reducing the fluctuation of the butyl rubber gauge, namely, controlling the property of an unvulcanized rubber, and a tire having the inner liner comprising it.

The present invention relates to a pneumatic tire having an inner liner comprising a rubber composition for a pneumatic tire in which the Mooney viscosity measured at 130° C. of an unvulcanized rubber of the rubber composition for a pneumatic tire comprising a butyl rubber is at least 45, wherein the average value and standard deviation of the butyl rubber gauge of shoulder portion of a finished tire satisfy:

(Standard deviation of butyl rubber gauge)/(Average value of butyl rubber gauge)≤0.060.

In the rubber component of the rubber composition for a pneumatic tire, it is preferable that the content of a halogenated butyl rubber is not less than 80% by weight and the content of a natural rubber is not more than 20% by weight.

It is preferable that the content of a halogenated butyl rubber in the rubber component of the rubber composition for a pneumatic tire is not less than 60% by weight, the content of a reclaimed butyl rubber is not more than 20% by weight and the content of a natural rubber is not more than 20% by weight.

Figure 1:
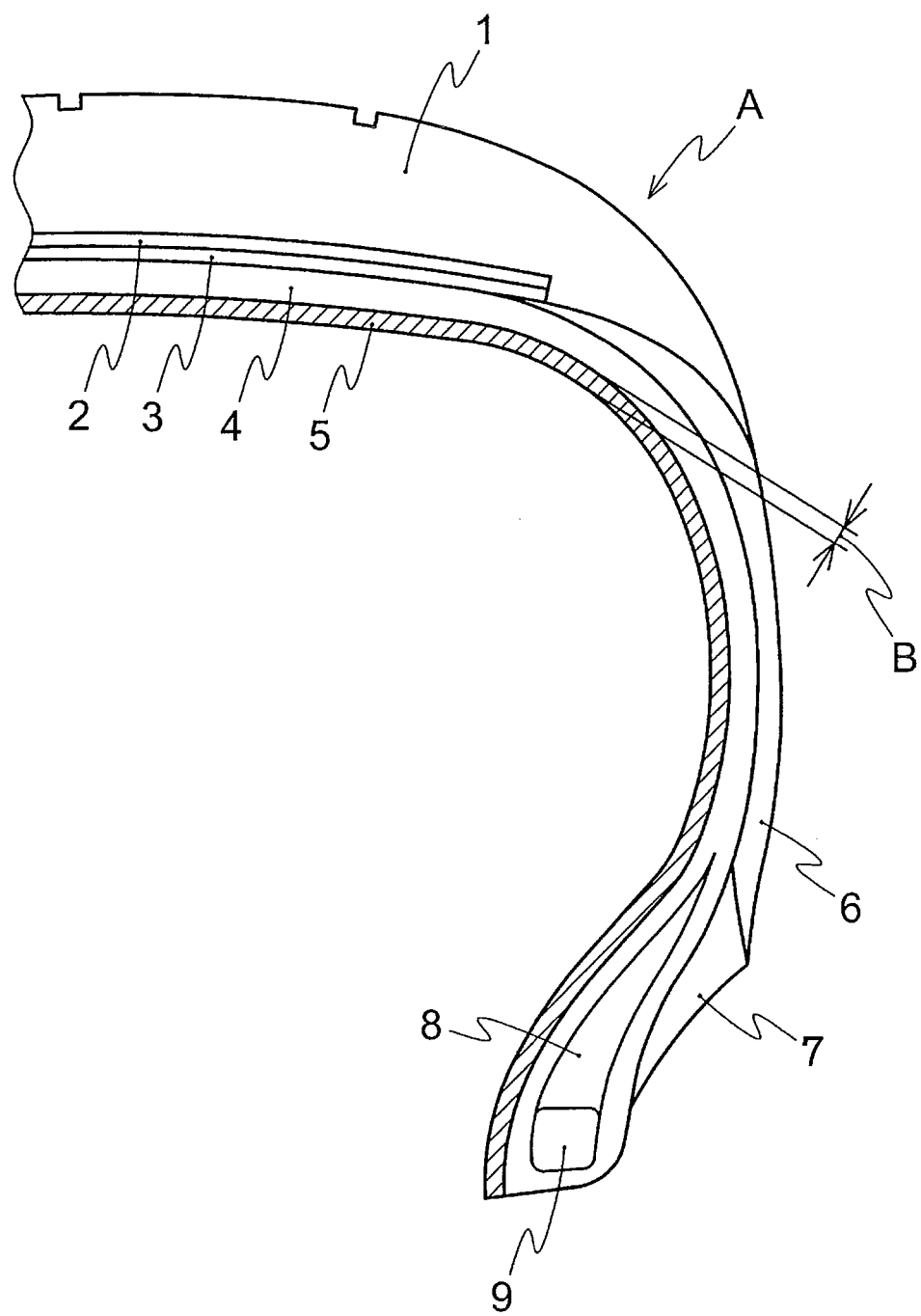
FIG. 1 is a schematic partial cross-sectional view illustrating the butyl rubber gauge of shoulder portion of a finished tire, in a pneumatic tire having an inner liner comprising the rubber composition for a pneumatic tire of the present invention.

DESCRIPTION OF CODES 1, 11 Tread
2, 12 First belt
3, 13 Second belt
4, 14 Carcass
5, 15 Inner liner
6 Sidewall
7 Clinch apex
8 Bead apex
9 Bead core
A Shoulder portion of tire
B Butyl rubber gauge
a to h 8 spots of butyl gauge of shoulder portion on tire periphery

BEST MODE FOR CARRYING OUT THE INVENTION

The rubber composition for a pneumatic tire of the present invention comprises a rubber composition in which the Mooney viscosity measured at 130° C. of the unvulcanized rubber of the rubber composition for a pneumatic tire including a butyl rubber is at least 45.

A butyl rubber can be used as the rubber component used for the rubber composition for a pneumatic tire of the present invention.

Example of the butyl rubber includes a butyl rubber (IIR) and a halogenated butyl rubber (X-IIR). These butyl rubbers are not specifically limited and they may be used alone or at least 2 may be used in combination.

Further, a diene rubber may be compounded as the rubber component used for the rubber composition for a pneumatic tire of the present invention.

As the diene rubber, for example, a natural rubber (NR), an isoprene rubber (IR), a butadiene rubber (BR), a styrene-butadiene rubber (SBR) and an ethylene-propylene-diene rubber (EPDM) are mentioned. These diene rubbers are not specifically limited, and they may be used alone and at least two kinds may be used in combination. These diene rubbers may be used alone and at least two kinds may be used in combination.

Among these, it is preferable from reason of adhesion and co-crosslinking with insulation that X-IIR is used as the butyl rubber and NR is used as the diene rubber.

The content of the halogenated butyl rubber (X-IIR) in the rubber component is preferably 70 to 100% by weight, more preferably 75 to 100% by weight and further preferably 80 to 100% by weight from reason that air permeability resistance can be improved. Further, when the butyl rubber and NR are used in combination, the content of a natural rubber (NR) in the rubber component is preferably 30 to 0% by weight, more preferably 25 to 0% by weight and further preferably 20 to 0% by weight, in order to enhance adhesive property with the rubber component constituting other members (for example, insulation) of a tire.

As the natural rubber (NR), those such as TSR and RSS#3 that have been conventionally used in the rubber industry can be used.

The halogenated butyl rubber (X-IIR) includes a chlorinated butyl rubber (Cl-IIR), a brominated butyl rubber (Br-IIR), a fluorinated butyl rubber (F-IIR) and an iodized butyl rubber (I-IIR), and a chlorinate butyl rubber (Cl-IIR) is preferable.

The chlorinated butyl rubber (Cl-IIR) includes Chlorobutyl rubber 1068 manufactured by Exxon Chemical Corporation, Chlorobutyl rubber 1066 manufactured by Exxon Chemical Corporation and Chlorobutyl 1240 manufactured by LANXESS AG.

As the rubber component of the rubber composition for a pneumatic tire of the present invention, a reclaimed butyl rubber can be used in addition to a halogenated butyl rubber and a natural rubber.

The reclaimed butyl rubber used in the present invention includes those obtained by using rubber products including a lot of butyl rubber such as a bladder used at production of a tire tube and a tire as raw material and pulverizing this, or those obtained by heating and pressuring the pulverized articles and those obtained by cutting (desulfurization treatment) the crosslinking bond of a rubber component and enabling vulcanization again. In general, the reclaimed butyl rubber includes not less than 50% by weight of a butyl rubber.

Example of the reclaimed butyl rubber includes those such as Tube reclaimed rubber manufactured by Muraoka Rubber Reclaiming Co., Ltd. and Bladder reclaimed rubber manufactured by USS Toyo Co., Ltd. The Tube reclaimed rubber manufactured by Muraoka Rubber Reclaiming Co., Ltd. is a reclaimed rubber produced by heating a butyl rubber for a tube under condition of pressurization. The Bladder reclaimed rubber manufactured by USS Toyo Co., Ltd. is obtained by pulverization by an extruder. These reclaimed butyl rubbers may be used alone and at least two kinds may be used in combination.

In the present invention, it is preferable from the viewpoint of the reutilization of resource that the reclaimed butyl rubber is used in combination in addition to the butyl rubber and NR as the rubber component.

When the reclaimed butyl rubber is used in combination in addition to the butyl rubber and NR, it is preferable that the halogenated butyl rubber that is high in air permeability resistance in comparison with a regular butyl rubber and fast in vulcanization speed is used as the butyl rubber because the content of a butyl rubber not halogenated (regular butyl rubber) is high. The content of the halogenated butyl rubber (X-IIR) in the rubber component is preferably 60 to 100% by weight, more preferably 70 to 100% by weight and further preferably 80 to 100% by weight. Further, when the reclaimed butyl rubber is used in combination in addition to the butyl rubber and NR, the content of the natural rubber (NR) in the rubber component is preferably 20 to 0% by weight, more preferably 15 to 0% by weight and further preferably 10 to 0% by weight because adhesive property with the rubber component constituting the other members (for example, insulation) of a tire can be enhanced. Further, when the reclaimed butyl rubber is used in combination in addition to the butyl rubber and NR, the content of the reclaimed butyl rubber in the rubber component is preferably 20 to 0% by weight, more preferably 15 to 0% by weight and further preferably 10 to 0% by weight in order to keep air permeability resistance and vulcanization speed.

Compounding agents that have been conventionally compounded in the rubber industry, for example, such as fillers for reinforcement such as carbon black, silica, calcium carbonate, talc and clay, oils, adhesiveness-providing resins (tackifier), homogenizing agents, various antioxidants, wax, stearic acid, zinc oxide, vulcanization agents such as sulfur and various vulcanization accelerators can be suitably compounded in the rubber composition of the present invention in addition to the rubber component, if necessary.

As the fillers for reinforcement, carbon black or calcium carbonate is preferably used and these fillers for reinforcement may be used alone and at least two kinds may be also used in combination.

Carbon black is not specifically limited and those having been conventionally used in the tire industry can be used. For example, NITERON 55U manufactured by Nippon Steel Chemical Co., Ltd. is mentioned.

The content of carbon black is preferably 50 to 80 parts by weight and more preferably 60 to 70 parts by weight based on 100 parts by weight of the rubber component from reason that the strength of the rubber composition can be enhanced.

Calcium carbonate is not specifically limited and those having been conventionally used in the tire industry can be used. For example, HTO-12 available from Hitachi Dairiseki Co., Ltd. is mentioned.

The content of calcium carbonate is preferably 10 to 30 parts by weight and more preferably 15 to 25 parts by weight based on 100 parts by weight of the rubber component from reason that the unit cost of the rubber composition can be lowered.

As process oil, oils such as paraffin process oil, naphthene process oil and aromatic process oil can be specifically used and, for example, DIANA PROCESS PA32 available from Idemitsu Kosan Co., Ltd. and PROCESS 200 available from Japan Energy Corporation (JOMO) are mentioned. These process oils may be used alone and at least two kinds may be used in combination.

The content of the process oil is preferably 5 to 30 parts by weight and more preferably 10 to 15 parts by weight based on 100 parts by weight of the rubber component from reason that the processability of a rubber can be improved.

In the present invention, a homogenizing agent (for example, commercially available mix resin) can be used.

The mix resin means the mixture of at least 2 resins. As resins used for the mix resin, example includes aromatic hydrocarbon resins such as a phenol adhesive resin, a chroman resin, an indene resin and a chroman-indene resin and aliphatic hydrocarbon resins such as $C_5$, $C_8$ and $C_9$. At least two kinds among these are selected and mixed to be able to be used. Among these, the combination of an aromatic hydrocarbon resin and an aliphatic hydrocarbon resin is preferable and the combination of a polymeric aromatic hydrocarbon resin and an aliphatic hydrocarbon resin is more preferable.

The mix resin includes specifically Struktol 40MS manufactured by Struktol Co., Ltd., Rhenosin 145A manufactured by Rhein Chemie Corp. and Promix 400 manufactured by Flow Polymers Inc.

The compounding amount of the mix resin is preferably 3 to 8 parts by weight and more preferably 4 to 6 parts by weight based on 100 parts by weight of the rubber component from reason that the homogeneity of a rubber can be improved and air permeability resistance can be improved.

In the present invention, a phenol resin can be used as the adhesive resin in order to improve the adhesiveness of the rubber component before vulcanization. The phenol adhesive resin includes specifically SP1068 resin manufactured by Schenectady Inc.

The compounding amount of the phenol adhesive resin is preferably 1.0 to 4.0 parts by weight and more preferably 1.5 to 2.5 parts by weight based on 100 parts by weight of the rubber component from reason that the adhesive property of a rubber can be improved.

FIG. 1 is a schematic partial cross-sectional view illustrating the butyl rubber gauge of shoulder portion of a finished tire, in a pneumatic tire having an inner liner comprising the rubber composition for a pneumatic tire of the present invention.

FIG. 1 shows schematically the respective members of a tread 1, the first belt 2, the second belt 3, a carcass 4, an inner liner 5, a sidewall 6, a clinch apex 7, a bead apex 8 and a bead core 9 and is a view showing the butyl rubber gauge B of a tire shoulder portion A of a tire measured in the present application.

Figure 2:
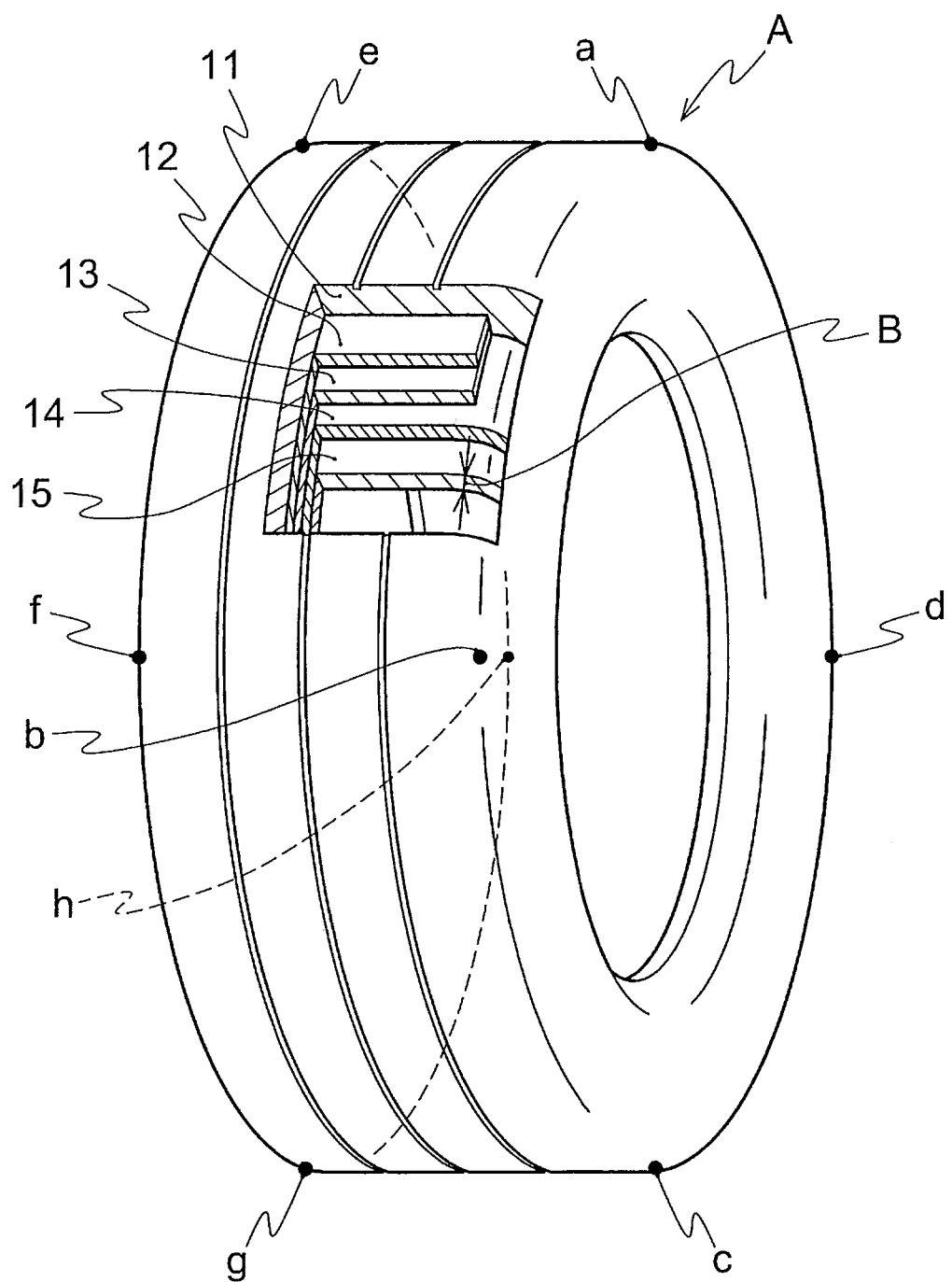
FIG. 2 is a schematic partially notched perspective view illustrating that the data of the butyl gauge of shoulder portion of a tire calculating the average of the butyl rubber gauge of the present invention are collected at 8 spots on the periphery of the tire, in a pneumatic tire having an inner liner comprising the rubber composition for a pneumatic tire of the present invention.

Further, FIG. 2 is a schematic partially notched perspective view illustrating that the data of the butyl gauge of shoulder portion of a tire calculating the average of the butyl rubber gauge of the present invention are collected at 8 spots on the periphery of the tire, in a pneumatic tire having an inner liner comprising the rubber composition for a pneumatic tire of the present invention.

FIG. 2 shows schematically the respective members of a tread 11, the first belt 12, the second belt 13, a carcass 14 and an inner liner 15 in the pneumatic tire of the present invention and is a view showing the butyl rubber gauge B of a tire shoulder portion A of a tire measured in the present application and measurement spots (spots a to h).

Since the inner liner constituting the pneumatic tire of the present invention comprises the rubber composition for a pneumatic tire compounding a butyl rubber, the thickness of the inner liner in the pneumatic tire is called as a butyl rubber gauge in the present invention as shown in FIGS. 1 and 2.

Further, when the average value of butyl rubber gauge (mm) is referred to as [a] and the standard deviation of butyl rubber gauge (mm) is referred to as [b] in the pneumatic tire having the inner liner comprising the rubber composition for a pneumatic tire of the present invention, it is necessary that the average value [a] and standard deviation [b] of the butyl rubber gauge of shoulder portion of a finished tire satisfy:

$$[b]/[a] \leq 0.060$$

and it is more preferable that they satisfy:

$$[b]/[a] \leq 0.045.$$

The average value [a] of the butyl rubber gauge (mm) and the standard deviation (mm) [b] of the butyl rubber gauge are specifically illustrated in (1) to (4) below.

(1) Butyl Rubber Gauge (mm)

The butyl rubber gauge in the present invention means the thickness of the inner liner in a pneumatic tire and is usually 0.25 to 1.50 mm.

(2) Average Value [a] of the Butyl Rubber Gauge (mm)

The average value [a] of the butyl rubber gauge (mm) in the present invention means a value obtained by collecting the data of the gauge of the shoulder portion of a tire at 8 spots on the periphery of the tire and dividing its total sum by sample number (N).

The spots of a tire measuring the average value [a] are at the shoulder portion of a tire.

(3) Standard Deviation [b] of the Butyl Rubber Gauge (mm)

The standard deviation [b] of the butyl rubber gauge (mm) in the present invention means a value obtained by subtracting respective measurement values from the average value, summing up their absolute values in total and dividing the total sum by (measurement number−1).

(4) [b]/[a]

(Standard deviation of the butyl rubber gauge (mm)/average value of the butyl rubber gauge (mm)), namely [b]/[a] in the present invention is the fluctuation coefficient of the butyl rubber gauge and means the fluctuation situation of thickness of the butyl rubber gauge.

It is preferable in a pneumatic tire that the fluctuation of finishing of the butyl rubber gauge is reduced in the inner liner, because inner pressure retention property must be maintained. When the fluctuation of finishing of the butyl rubber gauge is much in the inner liner of a pneumatic tire, air is eliminated from a thin portion and inner pressure tends to be rapidly lowered.

In the inner liner of a pneumatic tire in the present invention, the definition that the fluctuation of finishing of the butyl rubber gauge is reduced means that the value of [b]/[a] is small, and the fact that the value of [b]/[a] is at most 0.060 means that the fluctuation of finishing of the butyl rubber gauge is reduced, in the present invention. It is required that [b]/[a] is at most 0.060 and at most 0.050 is more preferable because the fluctuation of the butyl rubber gauge of the inner liner of a tire must be reduced.

Further, since the value of [b]/[a] in the present invention shows the fluctuation of finishing of the butyl rubber gauge, the value of [b]/[a] may be also zero (namely, it shows no fluctuation).

Further, it is necessary for reducing the fluctuation of finishing of the butyl rubber gauge in the inner liner of the pneumatic tire in the present invention that (1) the Mooney viscosity ($ML_{1+4}$, 130° C.) of the unvulcanized rubber is controlled at a specific value. Further, it is possible in the inner liner of the pneumatic tire in the present invention that the fluctuation of finishing of the butyl rubber gauge can be reduced also by controlling (2) the halogenated butyl rubber, (3) the mix resin or (4) the properties of the unvulcanized rubber.

(1) Mooney Viscosity of the Unvulcanized Rubber

Rubber flow at vulcanization step is suppressed by highly controlling the Mooney viscosity ($ML_{1+4}$, 130° C.) of the unvulcanized rubber. And the rubber remains at the shoulder portion of a tire even at adding the inner pressure of a press; therefore the fluctuation of finishing of the butyl rubber gauge can be reduced.

It is necessary for reducing the fluctuation of finishing of the butyl rubber gauge in the inner liner of the pneumatic tire in the present invention that (1) the Mooney viscosity ($ML_{1+4}$, 130° C.) of the unvulcanized rubber is 45 to 55 and 45 to 50 is preferable because the rubber residual gauge of the shoulder portion of a tire remains.

The rubber remains most hardly at the shoulder portion of a tire in the inner liner of the pneumatic tire and the shoulder portion of a tire is most easily thinned. The inner liner of a pneumatic tire deflates selectively at the thinnest spot. Namely, in the inner liner of the pneumatic tire, it is important that rubber residual gauge at the shoulder portion of a tire remains and a thin portion is not locally prepared.

(2) Halogenated Butyl Rubber

Since among the halogenated butyl rubber, HT-1068 with high viscosity (chlorobutyl rubber 1068) keeps the viscosity of the compounded rubber more highly than HT-1066 with low viscosity (chlorobutyl rubber 1066), the fluctuation of finishing of the butyl rubber gauge can be reduced.

(3) Mix Resin

The mix resin can also reduce the fluctuation of finishing of the butyl rubber gauge by enhancing the viscosity of compounded articles by being substituted with oil.

(4) Control of Properties of Unvulcanized Rubber

The fluctuation of finishing of the butyl rubber gauge can be also reduced by precipitating the scorch of the compounded articles.

The present invention has improved in good balance trade-off relation that when the butyl rubber gauge of a pneumatic tire is raised, the air permeability resistance (air retention property) of a tire is improved but the weight of the pneumatic tire gets heavy. Further, the present invention has eliminated locally thin spots at the inner liner of the pneumatic tire by suppressing the fluctuation of the butyl rubber gauge of a pneumatic tire (uniforming the butyl rubber gauge) and has improved so that the weight of a tire does not get heavy.

The rubber composition of the present invention is produced by a general process. Namely, the rubber composition of the present invention can be produced by kneading the compounding agents such as the rubber component with a Banbury mixer, a kneader and an open roll and then vulcanizing the mixture.

The rubber composition of the present invention is preferably used as the inner liner among tire members because air (inner pressure) retention property can be enhanced.

The pneumatic tire of the present invention can be produced by a usual method using the rubber composition of the present invention. Namely, the rubber composition of the present invention compounding the fore-mentioned compounding agents according to requirement is molded in, for example, the shape of an inner liner, and unvulcanized tires are molded by laminating it together with other members of a tire on a tire molding machine. The pneumatic tire of the present invention can be produced by heating and pressuring the unvulcanized tires in a vulcanizer.

EXAMPLES

The present invention is specifically illustrated based on Examples but the present invention is not limited only to these.

Various chemicals used in Examples are specifically described below.

Natural rubber (NR): TSR.

Halogenated butyl rubber A (X-IIR-A): Chlorobutyl rubber 1068 (Mooney viscosity ML (1+8) at 125° C.: 50±5) manufactured by Exxon Chemical Corporation.

Halogenated butyl rubber B (X-IIR-B): Chlorobutyl rubber 1066 (Mooney viscosity ML (1+8) at 125° C.: 38±4) manufactured by Exxon Chemical Corporation.

Tube reclaimed rubber: Reclaimed rubber derived from butyl tube (butyl rubber: those produced by heating under condition of pressurization) manufactured by Muraoka Rubber Reclaiming Co., Ltd.

Bladder reclaimed butyl rubber: Reclaimed rubber derived from bladder (those pulverized with an extruder) manufactured by USS Toyo Co., Ltd.

Carbon black: NITERON 55U manufactured by Nippon Steel Chemical Co., Ltd.

Process oil: DIANA PROCESS PA32 manufactured by Idemitsu Kosan Co., Ltd.

Phenol adhesive resin: SP1068 resin manufactured by Schenectady Inc.

Mix resin: Struktol 40MS (phenol adhesive resin is not included as an adhesion providing resin) manufactured by Sil & Xylary Inc.

Stearic acid: Stearic acid "Tsubaki" available from Nihon Oil & Fats Co., Ltd.

Zinc oxide: ZINC OXIDE #3 available from Mitsui Mining And Smelting Co., Ltd.

Powder sulfur: HK200-5 (treatment with 5% oil) available from Hosoi Chemical Industry Co., Ltd.

Vulcanization accelerator MBTS: NOCCELER MBTS (dibenzothiazyl disulfide) available from OUCHISHINKO CHEMICAL INDUSTRIAL CO., LTD.

Example 1 and Comparative Examples 1 to 3

Preparation of Unvulcanized Rubbers

Various chemicals other than sulfur and a vulcanization accelerator described in Table 1 were kneaded at 150° C. for 3 minutes using a 1.7 L Banbury mixer manufactured by Kobe Steel Ltd., then sulfur and the vulcanization accelerator were further compounded and the mixture was kneaded at 90° C. for 2 minutes by an open roll, to obtain unvulcanized rubbers (compounded articles A to D). The unvulcanized rubbers obtained were used for measurement below.

TABLE 1

|  | Ex. | Com. Ex. | | |
| --- | --- | --- | --- | --- |
|  | 1 | 1 | 2 | 3 |
| Compounded articles | A | B | C | D |
| Compounding amount (parts by weight) | | | | |
| NR | 20 | 20 | 20 | 20 |
| X-IIR-A | 80 | 80 | 0 | 0 |
| X-IIR-B | 0 | 0 | 80 | 80 |
| Carbon black | 65 | 65 | 65 | 65 |
| Calcium carbonate | 20 | 20 | 20 | 20 |
| Process oil | 10 | 15 | 10 | 15 |
| Phenol adhesive resin | 2 | 2 | 2 | 2 |
| Mix resin | 5 | 0 | 5 | 0 |
| Stearic acid | 1 | 1 | 1 | 1 |
| Zinc oxide | 3 | 3 | 3 | 3 |
| Powder sulfur (treatment with 5% oil) | 0.5 | 0.5 | 0.5 | 0.5 |
| Vulcanization accelerator MBTS | 1.3 | 1.3 | 1.3 | 1.3 |

Examples 2 and 3

Preparation of Unvulcanized Rubbers

Various chemicals other than sulfur and a vulcanization accelerator described in Table 2 were kneaded at 150° C. for 3 minutes using a 1.7 L Banbury mixer manufactured by Kobe Steel Ltd., then sulfur and the vulcanization accelerator were further compounded and the mixture was kneaded at 90° C. for 2 minutes by an open roll, to obtain unvulcanized rubbers (compounded articles E and F). The unvulcanized rubbers obtained were used for measurement below.

TABLE 2

|  | Ex. | | |
|---|---|---|---|
|  | 1 | 2 | 3 |
| Compounded articles | A | E | F |
| Compounding amount (parts by weight) | | | |
| NR | 20 | 20 | 20 |
| X-IIR-A | 80 | 0 | 0 |
| X-IIR-B | 0 | 70 | 70 |
| Tube reclaimed butyl rubber | 0 | 20 | 0 |
| Bladder reclaimed butyl rubber | 0 | 0 | 18.02 |
| Carbon black | 65 | 58.40 | 58.51 |
| Calcium carbonate | 20 | 18.80 | 19.19 |
| Process oil | 10 | 7.80 | 9.28 |
| Phenol adhesive resin | 2 | 2 | 2 |
| Mix resin | 5 | 5 | 5 |
| Stearic acid | 1 | 1 | 1 |
| Zinc oxide | 3 | 3 | 3 |
| Powder sulfur (treatment with 5% oil) | 0.5 | 0.5 | 0.5 |
| Vulcanization accelerator MBTS | 1.3 | 1.3 | 1.3 |

<Mooney Viscosity Index>

The Mooney viscosity (ML1+4) at 130° C. of the unvulcanized rubbers was measured in accordance with JIS K6300. It is indicated that the smaller the Mooney viscosity value is, the lower the viscosity is. And the larger the Mooney viscosity is, the higher the viscosity is.

(Production of Pneumatic Tire)

The unvulcanized rubbers (compounded articles A to F) were molded in an inner liner shape, the inner liners were laminated with other tire members and the laminates were vulcanized at the condition of 150° C. for 30 minutes to produce pneumatic tires (tire size: 215/45R17).

6 Tires were produced with respect to the unvulcanized rubbers (compounded articles A to F) respectively.

<Butyl Rubber Gauge of Finished Tire>

6 Tires produced by using the compounded article A were disjointed and the butyl rubber gauge of shoulder portion of the tire was measured at 8 spots on periphery and 48 spots in total per one tire using a universal projector. The compounded articles B to F were also similarly measured.

"The butyl rubber gauge of shoulder portion of the tire was measured at 8 spots on periphery per one tire" is 8 spots (measurement spots (a to h) in FIG. 2) that were measured by uniformly selecting the shoulder portion of a tire on periphery. 8 Spots were determined in the respective 6 tires of respective specifications.

Further, [a]: the average value (mm) of the butyl rubber gauge in Tables 3 and 4 is the average value of rubber gauges of 48 spots measured. The compounded articles B to D were also similarly measured.

Measurement results are shown in Tables 3 and 4.

TABLE 3

|  | Ex. | Com. Ex. | | |
|---|---|---|---|---|
|  | 1 | 1 | 2 | 3 |
| Compounded articles | A | B | C | D |
| Evaluation result Physical property of unvulcanized rubbers | | | | |
| Mooney viscosity Finishing rubber gauge | 46.0 | 42.0 | 39.5 | 37.1 |
| [a]: Average value (mm) of butyl rubber gauge | 0.34 | 0.40 | 0.39 | 0.38 |
| [b]: Standard deviation (mm) of butyl rubber gauge | 0.020 | 0.025 | 0.033 | 0.042 |
| [b]/[a] | 0.059 | 0.063 | 0.085 | 0.111 |

TABLE 4

|  | Ex. | | |
|---|---|---|---|
|  | 1 | 2 | 3 |
| Compounded articles | A | E | F |
| Evaluation result Physical property of unvulcanized rubbers | | | |
| Mooney viscosity Finishing rubber gauge | 46.0 | 45.0 | 47.0 |
| [a]: Average value (mm) of butyl rubber gauge | 0.34 | 0.34 | 0.34 |
| [b]: Standard deviation (mm) of butyl rubber gauge | 0.020 | 0.020 | 0.019 |
| [b]/[a] | 0.059 | 0.059 | 0.056 |

Figure 3:
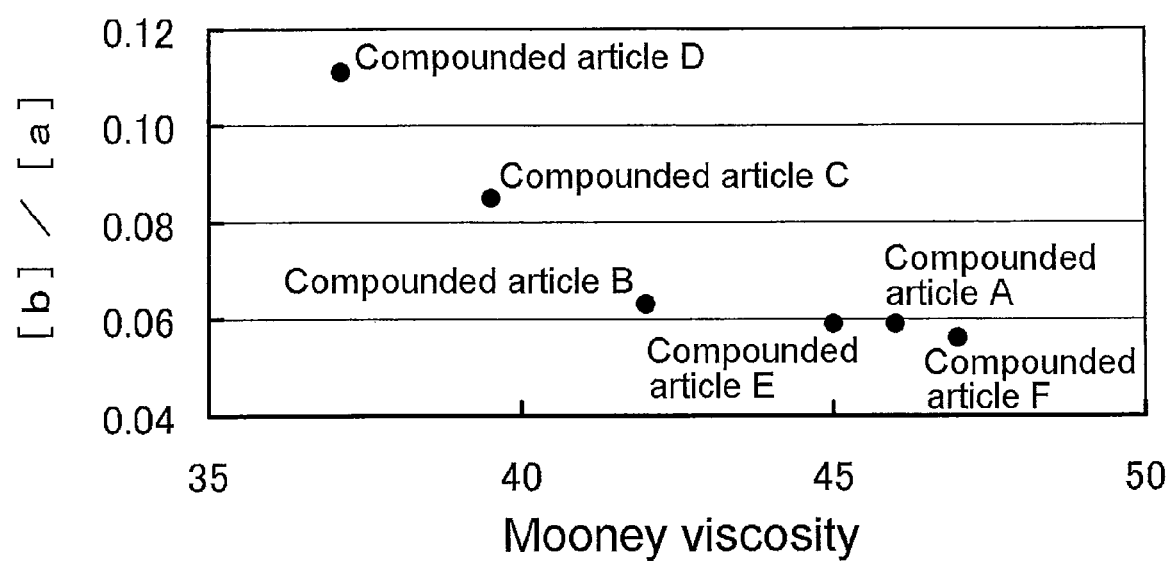
FIG. 3 is a graph showing relation between Mooney viscosity and the standard deviation [b] of butyl rubber gauge (mm)/the average value [a] of butyl rubber gauge (mm).

Further, result representing relation between Mooney viscosity and the standard deviation [b] of butyl rubber gauge (mm)/the average value [a] of butyl rubber gauge (mm) is shown in FIG. 3.

<Air Permeability Resistance Test>

Air permeability resistance test was carried out by molding 6 tires produced using the unvulcanized rubbers (compounded articles A to F) in an inner liner shape and by using the pneumatic tires obtained by laminating them with other tire members.

Tires with a size of 215/45R17 were prepared and inner pressure was set at 2.5 Mpa after rim assembly was carried out. The tires were left alone for 3 months at the condition of caverning the inner pressure and the lowering of tire inner pressure was measured as the lowering rate (%/month) of tire inner pressure. It is indicated that the smaller the lowering rate (%/month) of tire inner pressure is, the more superior the air permeability resistance is and inner pressure retention performance is good.

Measurement results are shown in Tables 5 and 6.

TABLE 5

|  | Ex. | Com. Ex. | | |
|---|---|---|---|---|
|  | 1 | 1 | 2 | 3 |
| Compounded articles | A | B | C | D |
| Evaluation result Air permeability resistance test (%/month) | | | | |
| Tire 1 | 2.5 | 2.6 | 2.8 | 2.9 |
| Tire 2 | 2.6 | 2.7 | 2.6 | 3.0 |
| Tire 3 | 2.5 | 2.7 | 2.7 | 2.7 |

TABLE 5-continued

|  | Ex. | Com. Ex. | | |
| --- | --- | --- | --- | --- |
|  | 1 | 1 | 2 | 3 |
| Tire 4 | 2.5 | 2.8 | 2.9 | 3.1 |
| Tire 5 | 2.5 | 2.5 | 3.0 | 3.3 |
| Tire 6 | 2.6 | 2.6 | 2.6 | 2.8 |
| Average | 2.5 | 2.7 | 2.8 | 3.0 |
| Standard deviation | 0.05 | 0.10 | 0.16 | 0.22 |

TABLE 6

|  | Ex. | | |
| --- | --- | --- | --- |
|  | 1 | 2 | 3 |
| Compounded articles | A | E | F |
| Evaluation result |  |  |  |
| Air permeability resistance test (%/month) |  |  |  |
| Tire 1 | 2.5 | 2.5 | 2.5 |
| Tire 2 | 2.6 | 2.6 | 2.6 |
| Tire 3 | 2.5 | 2.5 | 2.5 |
| Tire 4 | 2.5 | 2.5 | 2.5 |
| Tire 5 | 2.5 | 2.5 | 2.5 |
| Tire 6 | 2.6 | 2.6 | 2.6 |
| Average | 2.5 | 2.5 | 2.5 |
| Standard deviation | 0.05 | 0.05 | 0.05 |

In Examples 1 to 3, fluctuation between the tires is small in the air permeability resistance test and is at least 2.5 at minimum.

In Comparative Example 1, the fluctuation is similarly 2.5 at minimum but its average is 2.7 and tire weight is heavy by it.

In Comparative Example 2, the minimum is similarly 2.6 and good but its average is further thick and tire weight is heavy.

In Comparative Example 3, the minimum is similarly 2.7 and good but it is similar as Comparative Example 2.

INDUSTRIAL APPLICABILITY

According to the present invention, there can be provided a rubber composition improving the uniformity of a butyl rubber gauge and being superior in air permeability resistance (air retaining property) by a procedure capable of reducing the fluctuation of the butyl rubber gauge, namely, controlling the property of an unvulcanized rubber, when a tire is molded using a rubber composition in which the Mooney viscosity measured at 130° C. of the unvulcanized rubber of the rubber composition for a pneumatic tire including a butyl rubber is at least 45, and a tire having the inner liner comprising it.

The invention claimed is:

1. A pneumatic tire having an inner liner comprising a rubber composition for a pneumatic tire in which the $ML_{1+4}$ Mooney viscosity measured at 130° C. of an unvulcanized rubber of the rubber composition for a pneumatic tire comprising a butyl rubber is in the range 45 to 55, wherein said rubber composition for a pneumatic tire comprises 4 to 6 parts by weight of a mix resin and 1.5 to 2.5 parts by weight of a phenol adhesive resin based on 100 parts by weight of a rubber component which consists of 70 to 100% by weight of a halogenated butyl rubber and 30 to 0% by weight of a natural rubber, wherein a butyl rubber gauge of a shoulder portion of a finished tire is 0.25 to 1.50 millimeters in thickness, and the average value and standard deviation of the butyl rubber gauge of a shoulder portion of a finished tire satisfy the relationship:

(Standard deviation of butyl rubber gauge)/(Average value of butyl rubber gauge)≤0.060, and wherein said pneumatic tire is made by a process in which the unvulcanized tire including the unvulcanized inner liner is molded and vulcanized by heating and pressuring the unvulcanized tire in a vulcanizer such that the rubber flow of the inner liner during vulcanization is suppressed by controlling the Mooney viscosity ($ML_{1+4}$, 130° C.) of the unvulcanized rubber to be in the range 45 to 55.

2. A pneumatic tire having an inner liner comprising a rubber composition for a pneumatic tire in which the $ML_{1+4}$ Mooney viscosity measured at 130° C. of an unvulcanized rubber of the rubber composition for a pneumatic tire comprising a butyl rubber is in the range 45 to 55, wherein said rubber composition for a pneumatic tire comprises 4 to 6 parts by weight of a mix resin and 1.5 to 2.5 parts by weight of a phenol adhesive resin based on 100 parts by weight of a rubber component which consists of 60 to 100% by weight of a halogenated butyl rubber, 20 to 0% by weight of a natural rubber, and 20 to 0% by weight of a reclaimed butyl rubber, and wherein a butyl rubber gauge of a shoulder portion of a finished tire is 0.25 to 1.50 millimeters in thickness, and the average value and standard deviation of the butyl rubber gauge of a shoulder portion of a finished tire satisfy the relationship:

(Standard deviation of butyl rubber gauge)/(Average value of butyl rubber gauge)≤060, and wherein said pneumatic tire is made by a process in which the unvulcanized tire including the unvulcanized inner liner is molded and vulcanized by heating and pressuring the unvulcanized tire in a vulcanizer such that the rubber flow of the inner liner during vulcanization is suppressed by controlling the Mooney viscosity ($ML_{1+4}$, 130° C.) of the unvulcanized rubber to be in the range 45 to 55.

* * * * *